United States Patent [19]

Barker

[11] Patent Number: 5,165,030

[45] Date of Patent: Nov. 17, 1992

[54] METHOD AND SYSTEM FOR DYNAMIC CREATION OF DATA STREAM BASED UPON SYSTEM PARAMETERS AND OPERATOR SELECTIONS

[75] Inventor: Barbara A. Barker, Round Rock, Tex.

[73] Assignee: International Business Machines Corporation, Armonk, N.Y.

[21] Appl. No.: 321,931

[22] Filed: Mar. 10, 1989

[51] Int. Cl.⁵ .............. G06F 3/14; G06F 15/403; G06F 9/06; G06F 15/40

[52] U.S. Cl. .................. 395/500; 364/237.2; 364/234.3; 364/234.4; 364/231; 364/231.31; 364/242.94; 364/242.95; 364/242.96; 364/242.5; 364/280; 364/280.7; 364/281.7; 364/281.6; 364/283.3; 364/284.4; 364/286; 364/286.1; 364/286.2; 364/286.3; 364/419; 364/DIG. 1; 364/DIG. 2

[58] Field of Search .............. 340/706; 395/800, 500, 395/600, 325, 375, 147, 153; 364/419, 200 MS File, 900 MS File

[56] References Cited

U.S. PATENT DOCUMENTS

| | | | |
|---|---|---|---|
| 4,156,798 | 5/1979 | Doelz | 364/200 |
| 4,463,442 | 6/1984 | Dachowski et al. | 364/900 |
| 4,500,960 | 2/1985 | Babecki et al. | 364/900 |
| 4,583,161 | 4/1986 | Gunderson et al. | 364/200 |
| 4,586,158 | 4/1986 | Brandle | 364/900 |
| 4,648,061 | 3/1987 | Foster | 364/900 |
| 4,723,209 | 2/1988 | Hernandez et al. | 395/147 |
| 4,783,739 | 11/1988 | Calder | 364/200 |
| 4,805,134 | 2/1989 | Calo et al. | 395/600 |
| 4,829,470 | 5/1989 | Wang | 395/147 |
| 4,831,552 | 5/1989 | Scully et al. | 395/153 |
| 4,937,036 | 6/1990 | Beard et al. | 395/500 |
| 4,962,475 | 10/1990 | Hernandez et al. | 395/146 |

Primary Examiner—Thomas C. Lee
Assistant Examiner—Daniel H. Pan
Attorney, Agent, or Firm—Andrew J. Dillon

[57] ABSTRACT

A method for the dynamic creation of a data stream of continuous data elements for transmission by a data processing system. One or more data stream libraries are created within external or "in-line" storage facilities for utilization by the data stream build process and a plurality of data resources are stored therein. Data stream resources may include: data stream templates; environments; page structures; formatting descriptions; and, object data. Object data may include: text; image; graphics; font specifications; color tables; and, code page specifications. The data stream build process then prompts the operator for inputs which specify desired data stream characteristics. A plurality of options are then presented to the operator based upon the operator's inputs and selected data processing system parameters which are utilized in a heuristic manner as determined by system parameters. A data stream is then dynamically created from selected resources stored within the data stream libraries or created in response to selections by the operator from the plurality of options presented by the dynamic build process.

10 Claims, 6 Drawing Sheets

METHOD AND SYSTEM FOR DYNAMIC CREATION OF DATA STREAM BASED UPON SYSTEM PARAMETERS AND OPERATOR SELECTIONS

BACKGROUND OF THE INVENTION

1. Technical Field

This invention relates in general to the field of data processing systems and in particular to methods for the creation of data streams of continuous data elements suitable for transmission by a data processing system between multiple processes. Still more particularly, the present invention relates to methods for efficiently creating such data streams in a dynamic manner.

2. Background Art

Data streams are well known in the prior art. Data streams consisting of a plurality of continuous data elements are commonly utilized to transmit information between multiple processes in a data processing systems. In traditional data processing systems, data stream build is generally a batch process accomplished by translating application determined data to a predetermined format for interchange with a plurality of identical or similar applications. In such known data stream build processes, the operator's input is limited to specifying initial conditions and translation parameters prior to process initiation.

A more dynamic approach to the data stream build process may be implemented by actively translating operator specified data to a predetermined interchange format during application input. This process is not very efficient due to the fact that large portions of the data stream must be constantly rebuilt each time the operator modifies application data.

It should therefore be apparent that a need exists for a dynamic data stream build process whereby data streams may be efficiently and flexibly created in a dynamic manner by a data processing system operator.

SUMMARY OF THE INVENTION

It is therefore one object of the present invention to provide an improved data processing system.

It is another object of the present invention to provide an improved method of creating a data stream within a data processing system.

It is yet another object of the present invention to provide an improved method of dynamically creating a data stream of continuous data elements within a data processing system which is more efficient and flexible than known data stream creation techniques.

The foregoing objects are achieved as is now described. The method of the present invention utilizes one or more data stream libraries or storage files which are created and serve to store a plurality of data stream resources in an external location or an in-line location within the data stream. Data stream resources may include: data stream templates; environments; page structures; formatting descriptions; and, object data. Object data may include: text; image; graphics; font specifications; color tables; and, code page specifications. The data stream build process prompts the operator for inputs which specify desired data stream characteristics. A plurality of options are then presented to the operator based upon the operator's inputs and selected data processing system parameters which may be utilized to guide the data stream build process in a heuristic manner. A data stream is then dynamically created from selected resources stored within the data stream libraries or created in response to selections by the operator from the plurality of options presented by the dynamic build process.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
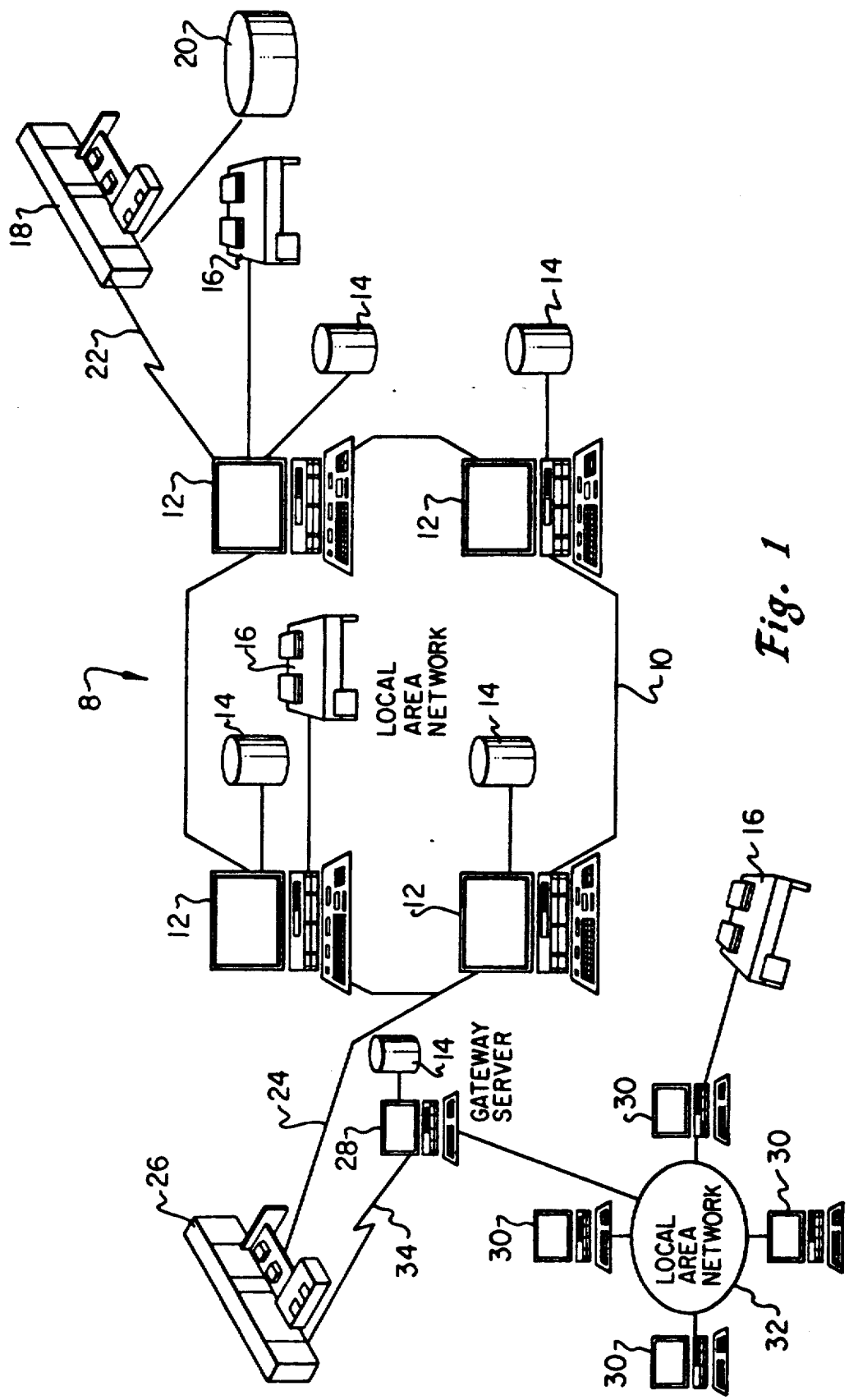
FIG. 1 depicts a pictorial representation of a data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more of such storage devices 14 may be utilized, in accordance with the method of the present invention, to store data stream libraries wherein the operator may periodically store selected data stream resources such as data stream templates, environments, page structures, formatting descriptions and object data, all of which may then be utilized to dynamically create a data stream.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station which serves to link Local Area Network (LAN) 32 to Local Area Network (LAN) 10.

Figure 2:
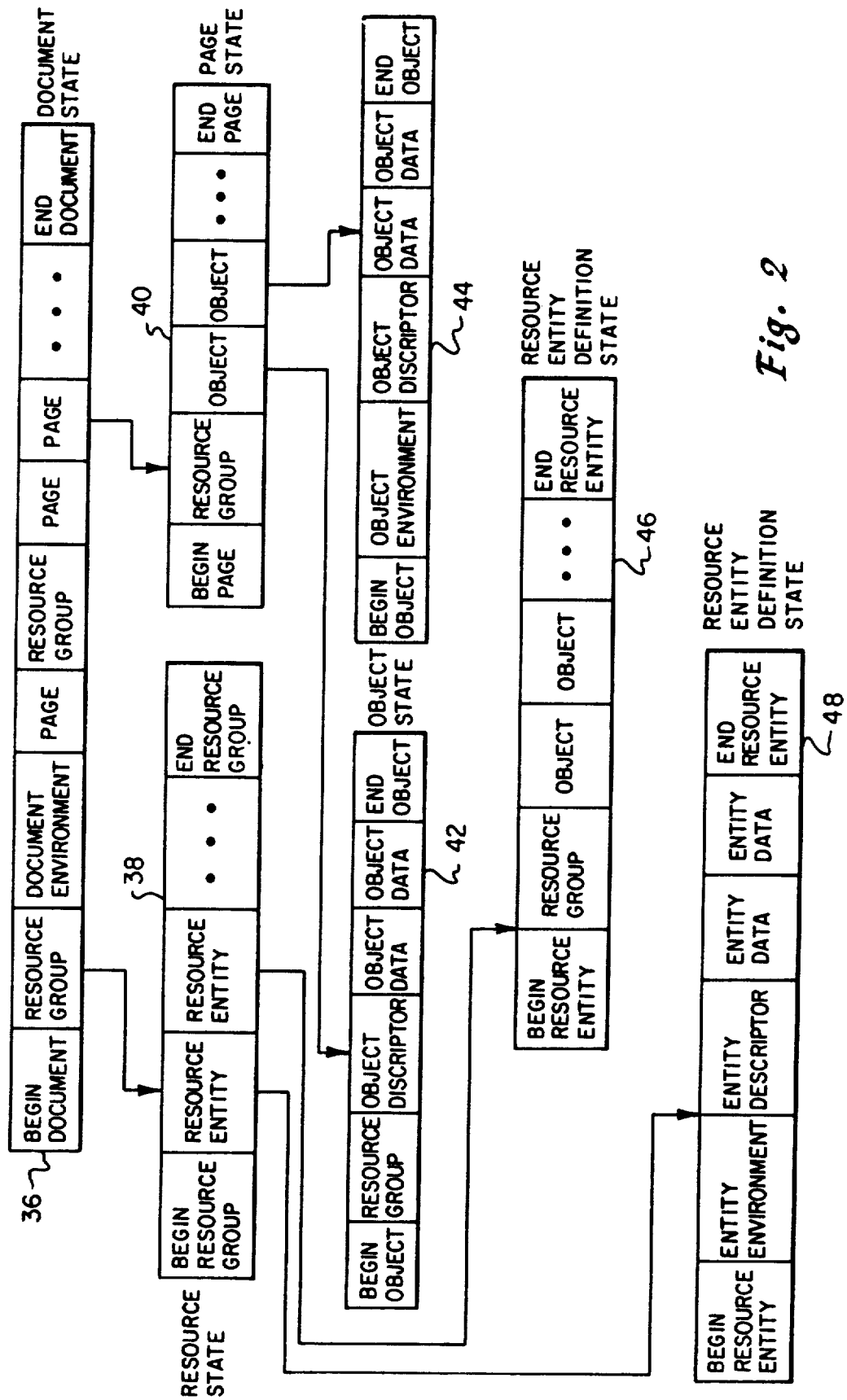
FIG. 2 depicts a pictorial representation of the creation of a data stream from multiple data stream resources.

Referring now to FIG. 2, there is depicted a pictorial representation of the creation of data stream 36, a document state data stream, from multiple data stream resources. As may be seen, after beginning the document represented by data stream 36, a resource group is designated which includes reference to another data stream resource, namely, resource state 38. Further, individual resource entities within resource state 38 may also include references to additional resources, such as resource entity definition states 46 and 48.

Referring again to data stream 36, it may be seen that a selected page within data stream 36 contains a reference to page state 40. Page state 40 may contain several references to multiple data objects which eventually refer to object states 42 and 44. In the manner described with respect to FIG. 2, it may be seen that a data stream may be dynamically created by reference to a plurality of data stream resources which have been previously stored in designated data stream libraries within one or more storage devices, as depicted in FIG. 1.

It should also be appreciated that when multiple data stream libraries are employed, a reference to such a library must necessarily include a library name and location so that the proper library may be located in order to obtain the data stream resource desired. Further, it should be apparent that the library location in which data stream resources are stored may be a so-called "in-line" library. An "in-line" library is one that is contained serially within the data stream itself. Resources stored therein are generally accessed in a predetermined search order such as "Last In First Out" (LIFO).

Figure 3:
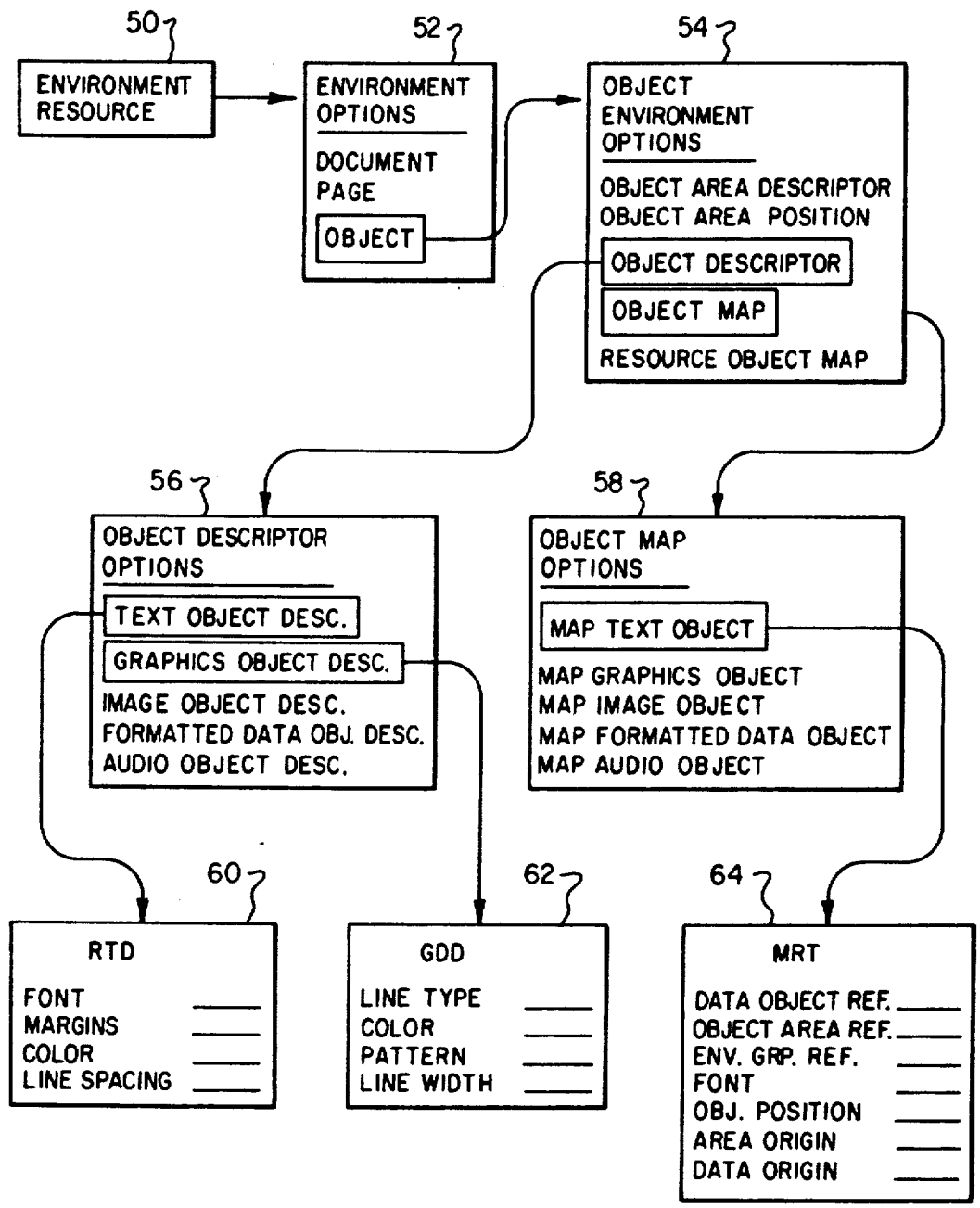
FIG. 3 depicts a pictorial representation of the creation of a hybrid data stream resource from portions of multiple resources.

With reference now to FIG. 3, there is depicted a pictorial representation of the creation of a hybrid data stream resource, from portions of multiple resources, for eventual insertion into a data stream by the data stream build process. As is illustrated, environment resource 50 includes a reference to environment options resource 52 which may be stored in any designated data stream library in the manner discussed above. Environment options resource 52 preferably includes references to document, page and object environment options which may be presented as options to promote the data processing system operator for selections which specify desired data stream characteristics. The selection of the object environment from environment options resource 52 will then in turn cause a reference to object environment options resource 54 which includes a plurality of options, some or all of which may be referred to or presented to the operator as options, based upon the operator's selections in conjunction with selected data system parameters in a heuristic manner.

In like manner, the selection or reference to the object descriptor option or the object map option within object environment options resource 54 will in turn result in a reference to additional resources. Namely, object descriptor options resource 56 and object map options resource 58. A selection of the text object descriptor option, graphics object descriptor option and the map text object option, by the operator or as a result of a previous reference, will cause the selection of the associated resources 60, 62 and 64 which will define the structured fields which make up environment resource 50. In this manner, environment resource 50 may be created as a "hybrid" resource in that it is created from selected portions of other data stream resources. Thus, a data stream library may be utilized to generate a large number of such hybrid resources for utilization in the dynamic creation of a data stream which may therefore include resources not replicated intact within the data stream library which was utilized to create that data stream.

Figure 4:
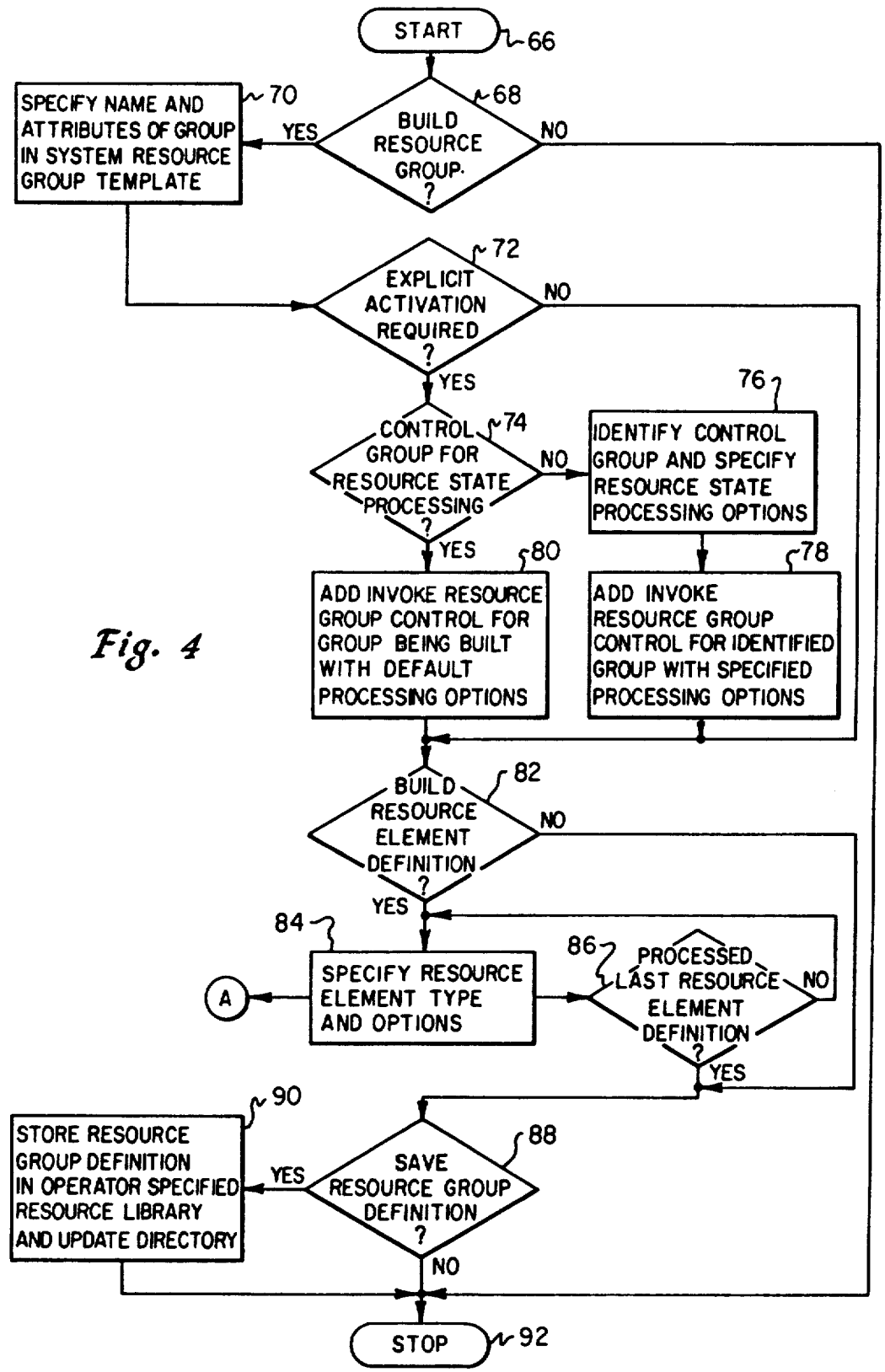
FIG. 4 depicts a logic flow chart illustrating the creation of a resource group for utilization in the method of the present invention.

Referring now to FIG. 4, there is depicted a logic flow chart illustrating the creation of a resource group for utilization in the method of the present invention. This process begins at block 66 which illustrates the starting of the process. Next, block 68 depicts the prompting of the operator for a decision as to whether or not he or she desires to build a resource group. If not, the process passes to block 92 where it will terminate. In the event the operator desires to build a resource group, as determined by block 68, then block 70 is utilized to illustrate the specification of the name and attributes of the group in a system resource group template. Those skilled in the art will appreciate that a template, when utilized in conjunction with a data stream, serves as the outline of a particular structured field within the data stream by setting forth the external and internal boundaries for that resource.

Next, block 72 depicts a determination of whether or not an explicit activation of the particular resource group is required. Certain resource groups may require explicit activation and will only be utilized in the build process when they have been referred to explicitly. Other resource groups may be invoked by the build process without explicit activation by the operator. In the event that explicit activation is required then block 74 is utilized to determine whether or not the group being built may be utilized as the control source for resource state processing. If so, block 80 depicts the adding of an invoke resource group control to the resource group being built with default processing options. In the event that an existing resource group is to be utilized as the control group for resource state processing, then block 76 illustrates the identification of a control group for such processing and a specification of the resource state processing options. The resource state processing options may include the add/replace option and any rules set forth by the operator for conflict resolution. That is, whether to resolve in favor of the resources in the current state or in favor of resources which are present in the identified resource group being invoked in the event of a conflict between those resources. Next, block 78 depicts the adding of an invoke resource group control for the control group which has been identified in block 76 along with specified processing options.

At this point, block 82 depicts the prompting of the operator to determine whether or not the operator desires to build a resource element definition. If not, the process passes to block 88, for a determination of whether or not the resource group definition should be saved. If the operator responds to the prompt indicating that he or she desires to build a resource element definition, then block 84 illustrates the specification of the resource element type and options associated therewith. This process is depicted in FIG. 5, and will be discussed in detail later herein.

Next, block 86 depicts a determination of whether or not the last resource element definition has been processed and if not, the process returns to block 84 for additional resource element definition processing. In the event that the last resource element definition has been processed, as determined by block 86, then block 88 illustrates a determination of whether or not the resource group definition should be saved. If so, block 90 depicts the storing of the resource group definition in an operator specified resource library and the updating of the directory for that library with an entry identifying the storage of this resource group. Thereafter, the process terminates, as illustrated in block 92.

Figure 5:
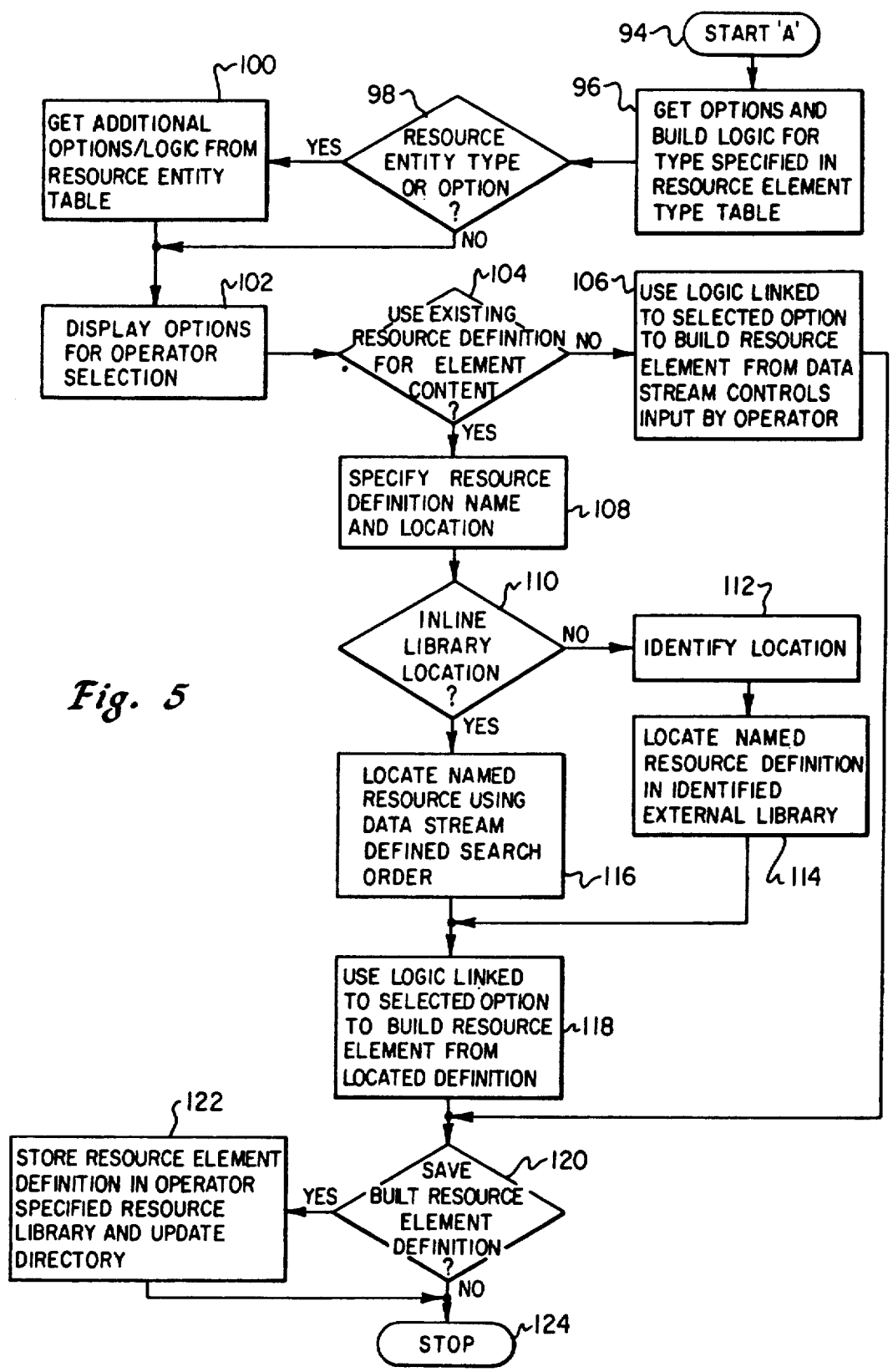
FIG. 5 depicts a logic flow chart illustrating the specification of a resource element for utilization in the method of the present invention.

With reference now to FIG. 5, there is depicted a logic flow chart illustrating the specification of a resource element, as generally indicated in block 84 of FIG. 4, for utilization in the method of the present invention. As may be seen, this process begins at block 94 and thereafter block 96 depicts the retrieval of the required options and build logic for the element type which has been specified by the operator from a Resource Element Type Table, such as the Table which follows:

| ENTITY | RESOURCE ELEMENT TYPE TABLE | | |
|---|---|---|---|
| | REQUIRED LOGIC | OPTIONS | OPTION LOGIC |
| Document | BldDocProc | Environment | BldDocEnvProc |
| | | Resource Group | BldResGrpProc |
| | | Page | BldPgeProc |
| Environment | | Document | BldDocEnvProc |
| | | Page | BldPgeEnvProc |
| | | Object | BldObjEnvProc |
| Page | BldPgeProc | InvResGrp | BldIRGProc |
| | | Resource Group | BldResGrpProc |
| | | Object | BldObjProc |
| Res-Group | BldResGrpProc | InvResGrp | BldIRGProc |
| | | Res Entity | BldResProc |
| Object | BldObjProc | Environment | BldObjEnvProc |
| | | Resource Group | BldResGrpProc |
| | | Include Object | BldIOBProc |
| | | Descriptor | BldObjDescProc |
| | | Data | BldObjDataProc |
| Res-Entity | | Doc Structure | BldDocSProc |
| | | Procedure Data | BldProcData |
| | | Objects | BldObjProc |
| | | Resource Objs | BldRObjProc |
| | | Variable Data | BldVDataProc |
| | | EnvironmentGrp | BldEnvGrpProc |

As may be seen, the Resource Element Type Table includes a list of element types including: document, environment, page, resource group object and resource entities. Also included within the Table are the required logic for each element type, any options available for each element type and the logic available for each option.

Next, block 98 illustrates a determination of whether or not the resource element specified by the operator is an entity type or option. If so, block 100 illustrates the retrieval of additional options and logic from a table such as the Resource Entity Table which follows:

| ENTITY | RESOURCE ENTITY TABLE | | |
|---|---|---|---|
| | REQUIRED LOGIC | OPTIONS | OPTION LOGIC |
| DocStructure | | Logical | BldLDocProc |
| | | Physical | BldPDocProc |
| ProcData | BldProcData | | |
| Objects | | Text | BldTxtProc |
| | | Graphics | BldGObjProc |
| | | Image | BldIObjProc |
| | | Formatted Data | BldFDataProc |
| | | Audio | BldAOBjProc |
| | | Line Type | BldLTypeProc |
| | | Font | BldFontProc |
| | | Color Table | BldCTblProc |
| | | Mixing Table | BldMTblProc |
| | | Code Page | BldCPgeProc |

As may be seen, the Resource Entity Table includes the following entities: document structure, procedure data, and data or resource objects. Also included within the Table are the required logic for each entity type, any options available for each entity type and the logic available for each option.

After the appropriate options/logic have been retrieved for either a resource element or resource entity, block 102 depicts the displaying of the appropriate options for operator selection. At this point in the process, block 104 illustrates a determination of whether or not the existing resource definition should be utilized to determine the element content. If not, block 106 depicts the utilization of logic linked to the selected option to build a resource element from data stream controls which are input by the operator.

In the event the existing resource definition is to be utilized for the element content, as determined by block 104, then block 108 illustrates the specifying of the resource definition name and location. Next, block 110 is utilized to determine whether or not the specified resource may be accessed from an "in-line" library location. If not, block 112 depicts the identification of the location and name of an external data stream library wherein the specified resource may be accessed. Thereafter, block 114 depicts the location of the named resource definition in the identified external library for utilization in the dynamic creation of the data stream resource element.

Referring again to block 110, in the event an "in-line" library location is specified, then block 116 depicts the location of the named resource within that in-line library location utilizing a data stream defined search order. As discussed above, this data stream defined search quarter typically generates a retrieval in a particular physical order such as "Last In First Out" (LIFO).

Next, block 118 illustrates the utilization of logic linked to the selected option to build a data stream resource element from the located definition which has been found within the identified external library or the in-line library location, in accordance with the appropriate search order. Block 120 then depicts a determination of whether or not the newly created resource element definition is to be saved and if so, block 122 illustrates the storing of the resource element definition in an operator specified resource library and the updating of the directory for that library with an entry identifying the storage of this resource element. Thereafter, the process terminates as depicted in block 124.

Figure 6:
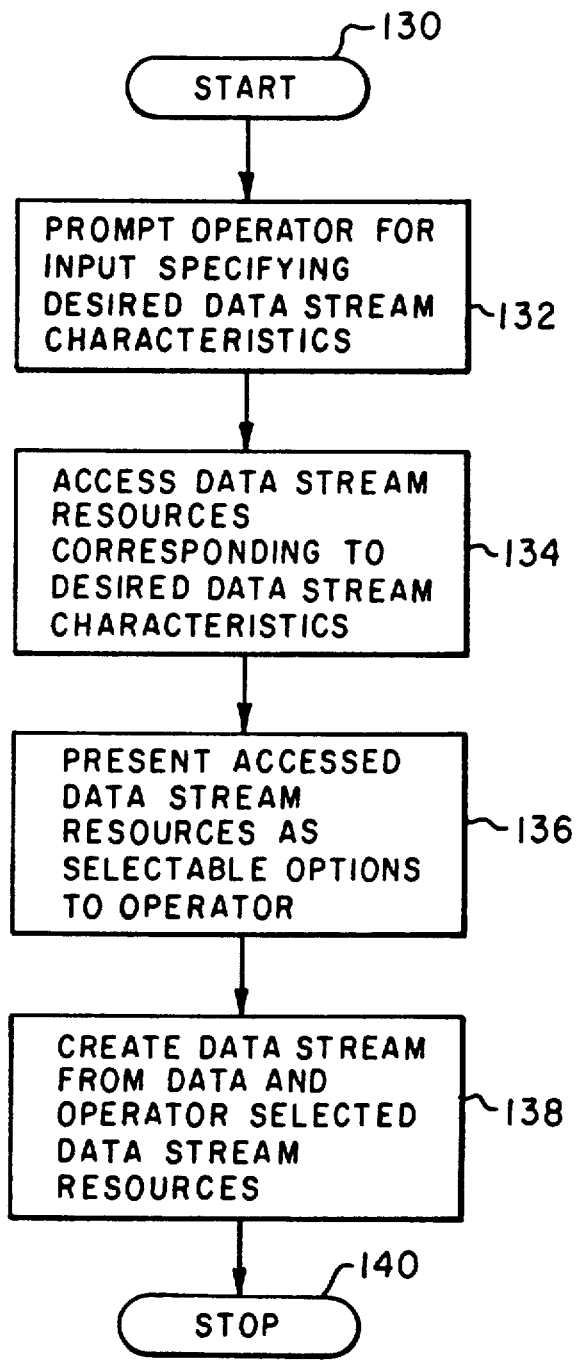
FIG. 6 depicts a logic flowchart illustrating the creation of an original data stream in accordance with the method and system of the present invention.

Referring now to FIG. 6, there is depicted a logic flowchart illustrating the creation of an original data stream within the data processing system in accordance with the method and system of the present invention. As illustrated, the process begins at block 130 and thereafter passes to block 132 which depicts the promptin of the operator for input which specifies desired data stream characteristics. Next, the process passes to block 134 which illustrates the accessing of data stream resources corresponding to the desired data stream characteristics. Thereafter, the process passes to block 136 which illustrates the presentation of accessed data stream resources as selectable options to the operator. Thereafer, as illustrated at block 138, an original data stream is created from data and the operator selected data stream resources. The process then terminates as depicted at block 140.

Those ordinarily skilled in the art will appreciate upon reference to the foregoing specification that the Applicant has provided a novel and flexible method of dynamically creating a data stream which incorporates the utilization of multiple data stream libraries, which may be external libraries or in-line within the data stream, to store a plurality of data stream resources. The data stream is then dynamically created by retrieving individual data stream resources from various locations within identified data stream libraries or by creating a hybrid resource by assembling individual portions from a plurality of such resources. In this manner, a data stream may be flexibly and rapidly constructed utilizing a finite number of resources without unduly restricting the operator in this task.

While the invention has been particularly shown and described with reference to a preferred embodiment, it will be understood by those skilled in the art that various changes in form and detail may be made therein without departing from the spirit and scope of the invention.

I claim:

1. A method of dynamically creating an original data stream of continuous data elements for transmission by a data processing system having a plurality of selectable data stream characteristcs, a plurality of data stream resources, and selected system parameters associated therewith, said method comprising the steps in a data processing system of:
   prompting an operator for inputs to said data processing system specifying desired data stream characteristics among said plurality of selectable data stream characteristics, each of said data stream characteristics having a plurality of corresponding data stream resources;
   accessing corresponding ones of said plurality of data stream resources in response to said operator inputs specifying desired data stream characteristics and said selected system parameters;
   presenting said accessed plurality of data stream resources as selectable options to said operator; and
   creating an original data stream within said data processing system in response to data stored in said data processing system and operator selections from said accessed plurality of data stream resources wherein said original data stream complies with said desired data stream characteristics and said selected system parameters.

2. The method of dynamically creating an original data stram of continuous data elements for transmission by a data processing system according to claim 1, further including the steps of:
   creating a data stream library within said data processing system; and
   storing a plurality of data stream resources within said data stream library.

3. The method of dynamically creating an original data stream of continuous data elements for transmission by a data processing system according to claim 2, wherein said step of storing a plurality of data stram resources within said data stream library comprisesthe step of storing a plurality of data stream templates within said data stream library.

4. The method of dynamically creating an original data stream of continuous data elements for transmission by a data processing system according to claim 2, wherein said step of storing a plurality of data stram resources within said data stream library comprisesthe step of storing formatting descriptions within said data stream library.

5. The method of dynamically creating an original data stream of continuous data elements for transmission by a data processing system according to claim 2, wherein said step of storing a plurality of data stram resources within said data stream library comprisesthe step of storing processing instructions within said data stream library.

6. The method of dynamically creating an original data stream of continuous data elements for transmission by a data processing system according to claim 2, wherein said step of storing a plurality of data stram resources within said data stream library comprisesthe step of storing a plurality of data objects within said data stream library.

7. The method of dynamically creating an original data stream of continuous data elements for transmission by a data processing system according to claim 2, wherein said step of storing a plurality of data stram resources within said data stream library comprisesthe step of storing a plurality of data stream resources within an in-line data stream library located within said data stream.

8. The method of dynamically creating an original data stream of continuous data elements for transmission by a data processing system according to claim 2, wherein said step of creating a data stream library comprises the step of creating multiple data stream libraries and wherein said input from said operator of said data processing system includes a designation of a selected one of said multple data stream libraries.

9. A data processing system for dynamically creating an original data stream of continuous data elements for transmission by said data processing system wherein said data processing system includes a plurality of selectable data stream characteristics, a plurality of data stream resources, and selected system parameters associated therewith, said data processing system comprising:
   means for prompting an operator for input to said data processing system specifying desired data stream characteristics among said plurality of selectable data stream characteristics, each of said data stream characteristics having a plurality of corresponding data stream resources;
   means for accessing for corresponding ones of said plurality of data stream resources in response to said operator inputs specifying desired data stream characteristics and said selected system parameters;
   means for presenting said accessed plurality of data stream resources as selectable options to said operator; and
   means for creating an original data stream within said data processing system in response to data stored in said data processing system and operator selections from said accessed plurality of data stream resources wherein said original data stream complies with said desired data characteristics and said selected system parameters.

10. The data processing system for dynamically creating an original data stream of continuous data elements for transmission by said data processing system according to claim 9, further including:

means for creating a data stream library within said data processing system; and memory means for storing a plurality of data stream resources within said data stream library.

* * * * *